Aug. 8, 1950

B. R. CARSON 2,517,630

PHONOGRAPH TURNTABLE SPINDLE

Filed April 1, 1946.

INVENTOR.
Benjamin R. Carson
BY C. D. Tuska
ATTORNEY

Patented Aug. 8, 1950

2,517,630

UNITED STATES PATENT OFFICE 2,517,630

PHONOGRAPH TURNTABLE SPINDLE

Benjamin R. Carson, Haddonfield, N. J., assignor to Radio Corporation of America, a corporation of Delaware Application April 1, 1946, Serial No. 658,645

3 Claims. (Cl. 274—10)

Figure 1:
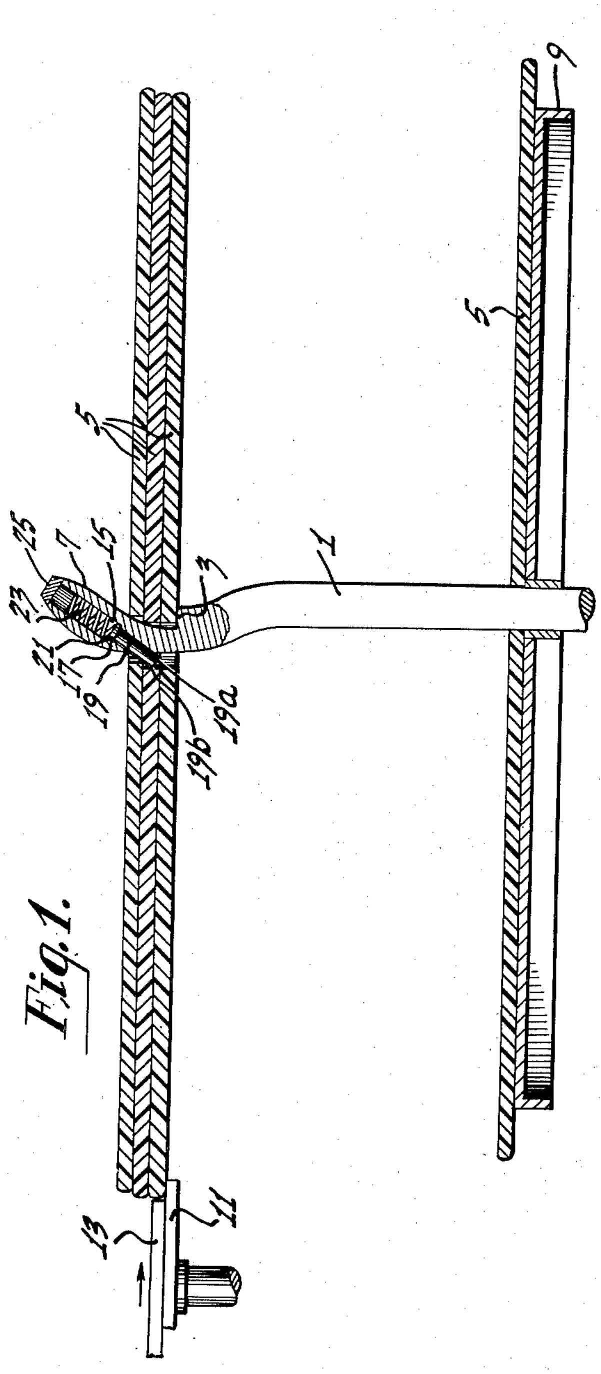

This invention relates to phonograph turntable spindles, and more particularly to spindles for those drop type automatic phonographs in which the unplayed records of a stack are supported adjacent their centers upon a shoulder on the spindle and adjacent their peripheries upon a supporting member at one side of the turntable.

In phonographs of this type, the spindles are arranged with a stack detaining member above the record supporting shoulder for holding back all of the records of the stack except the lowermost one while the lowermost record is being shifted laterally off of the supporting shoulder on the spindle to free it from the stack so that it can slide down along the spindle to the turntable. Since the stack detaining member is offset with respect to the body of the spindle, a problem is presented when the played records are to be removed from the turntable. As one solution for this problem, it has been proposed to make the spindle removable from the turntable so that, when the played records are to be removed, the spindle is first withdrawn, after which the records can be lifted freely. However, there are a number of objections to the use of a removable spindle. It has also been proposed to arrange the stack detaining member in a manner such that it will yield in response to pressure applied by the played records as they are raised from the turntable. As constructed heretofore, however, spindles of this type have not been found altogether suitable.

The primary object of my present invention is to provide an improved phonograph turntable spindle for the form of drop type phonographs indicated above which will be free from the objections found in similar, prior art spindles.

More particularly it is an object of my present invention to provide an improved phonograph turntable spindle for drop type, automatic phonographs which may be mounted in a fixed position concentric with the turntable and which need not be removed to enable removal of the played records.

It is also an object of my present invention to provide an improved phonograph turntable spindle as aforesaid which will incorporate a detaining member for the unplayed records of the stack but which will, nevertheless, permit free and easy removal of all of the played records along the entire length of the spindle notwithstanding such detaining member.

Another object of my present invention is to provide an improved phonograph turntable spindle of the type set forth above which will permit easy and ready removal of played records from the turntable even though there may still be some unplayed records remaining in the stack, without first having to remove the latter records as is necessary in most prior art spindles of the type under consideration.

Still another object of my present invention is to provide an improved phonograph turntable spindle as aforesaid which will not injure the records either during the transference thereof from the stack to the turntable, or during removal thereof from the turntable.

A further object of my present invention is to provide an improved phonograph turntable spindle as aforesaid which is very simple in construction, which can be easily fabricated, which is economical in cost, and which is highly efficient in use.

In accordance with my present invention, I form the spindle with a shank portion which is adapted to be mounted in fixed, concentric relation with the turntable and which is provided with a record supporting shoulder on which the lowermost record of a stack of unplayed records can rest. The spindle is also provided with a head portion which extends beyond or above the aforementioned shoulder in offset relation with respect to the shoulder. The head portion is formed with a substantially longitudinally extending bore or recess in which is slidably mounted a record detaining member in the form of a plunger or the like. The recess or bore in the spindle head portion terminates in an opening on the side thereof which is opposite the record supporting shoulder, and the plunger is arranged to normally extend through this opening a distance such that it is spaced from the record supporting shoulder a distance just slightly greater than the thickness of a conventional disc record. It is apparent, therefore, that the lowermost record of the stack, when resting on the spindle shoulder, can be moved laterally by any suitable ejector mechanism, many of which are well known in the prior art, to push that record off of the spindle shoulder and thereby free it from the stack so that it can slide down along the spindle shank portion toward the turntable. At the same time, the record detaining plunger or the like will prevent the remaining records of the stack from being moved laterally along with the lowermost record.

The lower end of the plunger is arranged angularly with respect to the adjacent side of the spindle head portion. Thus, when played records are to be removed, they are merely raised up along the spindle shank until they engage the inclined, lower end of the plunger. Continued upward movement of the played records will then cam the plunger into the recess in the spindle head and thus clear the path for their movement along the spindle head whereby they can be moved freely along the entire length of the spindle.

Figure 2:
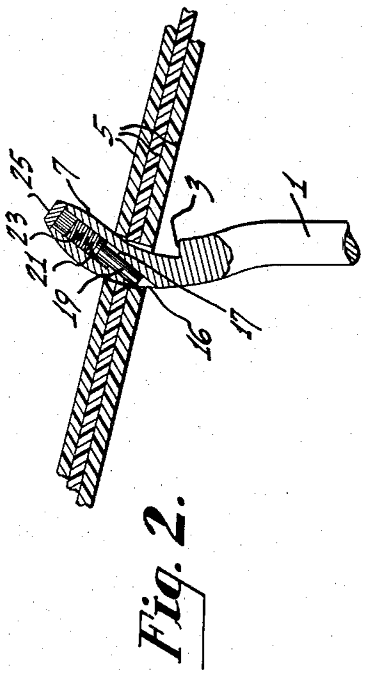

The novel features of my invention, as well as additional objects and advantages thereof, will better be understood from the following description of one embodiment thereof, when read in connection with the accompanying drawing, in which Figure 1 is a side elevation, partly in section, of a phonograph embodying one form of spindle constructed in accordance with my present invention, and Figure 2 is a similar, fragmentary view showing the manner in which the plunger is forced into its bore or recess upon engagement therewith of played records as they are raised up along the spindle.

Referring more particularly to the drawing wherein similar reference characters designate corresponding parts throughout, there is shown a spindle having a shank portion 1 formed with a shoulder 3 on which the lowermost record of a stack of records 5 may rest, the spindle being also provided with a head portion 7 which is offset relative to the shank portion 1 and which extends angularly with respect to the shoulder 3 and the shank portion 1. The shank 1 is adapted to be arranged in a fixed or stationary position concentrically with a turntable 9 on which the records 5 rest during playing. The unplayed records of the stack are supported above the turntable 9 adjacent their center holes upon the spindle shoulder 3 and adjacent their peripheries by a suitable supporting member 11. To free each successive, lowermost record of the stack for dropping toward the turntable, a suitable slide 13 may be provided in conjunction with the support 11. When the slide is moved to the right, as shown by the appended arrow in Figure 1, the lowermost record is moved laterally to move it off of the shoulder 3 whereupon it becomes free to slide down along the shank 1 onto the turntable or onto the records which have previously dropped thereonto.

To prevent all but the lowermost record of the stack from moving laterally upon movement of the slide 13, the spindle head 7 is formed with a substantially longitudinal bore 15 which has a reduced diameter at its lower end to provide an annular shoulder 17 which acts as a stop for a purpose to be described shortly. The reduced, lower end of the bore 15 terminates in an opening 16 at the side of the head 7 which is opposite the spindle shoulder 3. Slidably mounted in the bore 15 is a plunger 19 which has a flange or extension 21 formed on its upper end for cooperation with the shoulder 17. The plunger 19 is normally held in its lowered position as determined by engagement of the flange 21 with the stop or shoulder 17 by means of a coil spring 23 confined within the bore 15 between the plunger flange 21 and a cap 25 which is force fit into the upper end of the bore 15 and which constitutes the upper tip of the spindle.

In its advanced or lowered position, the plunger 19 is so disposed that its lower end 19*a* is spaced above the shoulder 3 a distance just somewhat greater than the thickness of a conventional, disc record 5. Thus, when the slide 13 moves in the direction of the appended arrow, it will engage the lowermost record of the stack and move it laterally under the plunger end 19*a* to free it from the shoulder 3 in the manner described above. However, the next higher record of the stack will be restrained from lateral movement by reason of the fact that it will engage the projecting corner 19*b* of the plunger 19. Hence, only the lowermost record will be released from the stack. As soon as the lowermost record has dropped down to the turntable, the entire stack will drop down a distance equal to the distance of the released record and the new lowermost record will then come to rest on the shoulder 3. This action is repeated during each record changing cycle in known manner until all, or as many records of the stack as may be desired, have been played.

When it is desired to remove the played records from the turntable, it is merely necessary to raise them up along the shank portion 1 until the uppermost one of these records engages the lower plunger end 19*a*. This end 19*a* is inclined with respect to the adjacent side portion of the head 7, as will be clearly seen from Fig. 1. Consequently, when a rising record engages the plunger end 19*a*, continued upward movement of the record will cam the plunger 19 into the recess or bore 15 to the position shown in Fig. 2. Here, it will be noted that the plunger 19 is entirely clear of the rising records and that these records are therefore free to be moved upwardly along the spindle head 7 for easy removal thereof. In other words, the rising records clear their own path for free and easy removal thereof along the entire length of the spindle. This is true even if there are records still remaining in the unplayed stack. In such case, the rising record engages the lowermost record of the stack, pushes the latter record upwardly until it, itself, engages the inclined plunger end 19*a*, and thereafter forces the plunger to its retracted position of Fig. 2. As soon as the rising records have passed the corner 19*b* of the retracted plunger, the spring 23 will, of course, immediately return the plunger 19 to its lower, operative position in readiness for cooperation with the records of a new stack.

From the foregoing description, it will undoubtedly be apparent to those skilled in the art that I have provided an improved spindle for drop type record changers which is free from many objections found in similar, prior art spindles. Although I have shown and described only a single embodiment of my present invention, it will undoubtedly be apparent to those skilled in the art that many other modifications, as well as variations in that described above, are possible. For example, instead of providing the spindle head 7 with a longitudinal bore, it may be provided with a milled slot and a plate-like slide member may be arranged therein in place of the plunger 17. Similarly, the head 7 need not necessarily be inclined with respect to the spindle shank 1, but may rise vertically therefrom in laterally offset relation. In such case, the recess or bore 15 may be arranged angularly within the head 7, or the head 7 may be suitably inclined at the opening 16 to cam the rising record sidewise toward the support 11 and thereby cause the records to gradually force the detaining member 19 into its bore or recess 15. Other changes of like nature are also possible. I therefore desire that the foregoing shall be considered merely as illustrative and not as limiting.

I claim as my invention:

1. A record feed controlling spindle for phonographs that automatically reproduce in sequence the recordings on successive disc-shaped records having center holes, said spindle comprising a shank portion for mounting to guide the successive records to be reproduced into reproducing positions, said shank portion having a record supporting shoulder thereon, a head portion beyond said shoulder for reception, by their center holes, of a stack of unplayed records the lowermost one of which may rest on said shoulder, said head portion having a hollow bore therein terminating in an opening at the side of said head opposite said shoulder, and a record detaining member movably carried in said hollow bore, said member having an elongated portion normally extending through said opening at an angle less than a right angle to the flare of said shoulder to a point spaced from said shoulder a distance somewhat greater than the thickness of a record whereby said lowermost record may be moved laterally off of said shoulder while said detaining member prevents lateral movement of the remaining records of the stack, the transverse cross section of said elongated portion being substantially equal to the cross section of said hollow portion at said opening, and said extending portion of the detaining member having an edge that is angular in longitudinal section and projects in direction opposite to the shoulder as the sole engagement element for contacting the center hole edge of the lowest detained record at a point intermediate the record thickness.

2. In a record feed controlling spindle for phonographs that automatically reproduce in sequence the recordings on successive disc-shaped records having center holes: an elongated shank portion for mounting to guide the successive records to be reproduced into reproducing position, said shank portion having a record supporting shoulder on one lateral side thereof; a head portion extending beyond said shoulder and connected to said shank by a section of reduced lateral width for reception, by their center holes, of a stack of records to be played, with the first record resting against said shoulder, and the second record against the first; said head portion having a bore extending in a direction inclined with respect to the shank portion and terminating in an opening on the side opposite to said shoulder; and a record detaining member slidably carried in said bore, said member having a retractible portion normally extending out through said opening to a point spaced from the level of the shoulder by a distance somewhat greater than the thickness of a record to detain all but said first record against a shift laterally of the spindle and off the shoulder for feeding movement along said shank portion; the transverse cross section of said elongated portion of said detaining member being substantially equal to the transverse cross section of said bore at said opening, said extending portion of the detaining member having an edge angular in longitudinal section and projecting in a direction opposite to the shoulder as the sole engagement element for contacting the center hole edge of the second record at a location intermediate the record thickness.

3. The combination as defined by claim 2 in which the detaining member is rectangular in longitudinal cross section and the projecting portion is one edge of said member.

BENJAMIN R. CARSON.

No references cited.